US005495405A

United States Patent [19]

Fujimura et al.

[11] Patent Number: 5,495,405

[45] Date of Patent: Feb. 27, 1996

[54] INVERTER CIRCUIT FOR USE WITH DISCHARGE TUBE

[75] Inventors: Tadamasa Fujimura, Tokyo; Masakazu Ushijima, 3-10, Amanuma 1-chome, Suginami-ku, 167 Tokyo, Japan

[73] Assignee: Masakazu Ushijima, Japan

[21] Appl. No.: 297,736

[22] Filed: Aug. 29, 1994

[30] Foreign Application Priority Data

Aug. 30, 1993 [JP] Japan .................................... 5-237342

[51] Int. Cl.$^{6}$ .................................................... H02M 3/335

[52] U.S. Cl. ................................ 363/133; 363/20; 363/56

[58] Field of Search ................................ 315/209 R, 219, 315/224, DIG. 4, DIG. 7, 411; 331/113 A; 363/131, 132, 33, 133, 20–21, 56, 97; 323/207, 228, 291

[56] References Cited

U.S. PATENT DOCUMENTS

| | | | |
|---|---|---|---|
| 4,027,200 | 5/1977 | Sahara et al. | 315/411 |
| 4,212,053 | 7/1980 | Sichenzia | 363/39 |
| 4,281,374 | 7/1981 | Archer | 363/41 |
| 4,377,842 | 3/1983 | Cambier | 363/20 |
| 4,572,990 | 2/1986 | Leale et al. | 315/220 |
| 4,675,796 | 6/1987 | Gautherin et al. | 363/20 |
| 4,698,741 | 10/1987 | Pacholok | 363/131 |
| 4,870,554 | 9/1989 | Smith | 363/20 |
| 5,309,344 | 5/1994 | Smith | 363/20 |

FOREIGN PATENT DOCUMENTS 0505947 3/1992 European Pat. Off. .

*Primary Examiner*—Peter S. Wong
*Assistant Examiner*—Aditya Krishnan
*Attorney, Agent, or Firm*—King and Schickli

[57] ABSTRACT

An inverter circuit for use with a discharge tube or lamp such as a cold-cathode fluorescent lamp, a hot-cathode fluorescent lamp, a mercury arc lamp, a metal halide lamp, a neon lamp or the like is provided. The secondary side circuit of a step-up transformer used in the inverter circuit is constructed as a high frequency power supply circuit and a parasitic or stray capacitance produced in the secondary side circuit of the step-up transformer is utilized as a portion or component of a resonance circuit consisting of an inductive ballast or the inductive output of a leakage flux type step-up transformer and the parasitic capacitance.

5 Claims, 4 Drawing Sheets

INVERTER CIRCUIT FOR USE WITH DISCHARGE TUBE

BACKGROUND OF THE INVENTION

1. Field of the Invention

The present invention relates to an inverter circuit for use with a discharge tube or lamp such as a cold-cathode fluorescent lamp, a hot-cathode fluorescent lamp, a mercury arc lamp, a metal halide lamp, a neon lamp or the like.

2. Prior Art

It is necessary for turning on such a discharge tube or lamp to use a commercial AC power supply or a high-voltage power supply utilizing a commercial AC power supply and a lighting or starting circuit comprising a ballast for limiting a current. Recently, for the sake of miniaturizing such starting circuits and also of popularizing portable type devices or apparatus such as small size liquid crystal display devices each utilizing a discharge lamp, for example, as a back lighting source, various inverter circuits have been used for obtaining a high-voltage power supply from a low-voltage DC power source thereby turning on a discharge tube.

A capacitive ballast or an inductive ballast may be used in such an inverter circuit for a discharge tube, and a capacitive capacitor has generally been used as a ballast.

While an inverter circuit for a discharge tube of smaller size is required because of making portable equipments small in size and light in weight, it is known in general that peripheral components or parts such as a step-up transformer, capacitor and the like can be miniaturized by making a driving frequency for an inverter circuit higher so that the whole of an inverter circuit can be miniaturized in size.

However, as the driving frequency becomes higher, the influence of a parasitic or stray capacitance caused by a secondary winding of a step-up transformer, wiring or the like cannot be ignored.

In addition, in many cases, a closed magnetic flux type core, namely, an EI type core consisting of two magnetic pieces of E and I shapes or an EE type core consisting of two magnetic pieces of E and E shapes has been adopted as that of a step-up transformer used in an inverter circuit for a discharge tube on the basis of fundamental circuit design or plan in which a leakage of magnetic flux is considered to be harmful in efficiency.

It is a step-up transformer that occupies the largest space in an inverter circuit for a discharge tube, and the difficulty of miniaturization in size of the step-up transformer makes it impossible to miniaturize the whole inverter circuit in size.

Hence in order to reduce the step-up transformer in size, as the driving frequency for the inverter circuit for a discharge tube is made higher, a parasitic or stray capacitance or capacitances caused in a secondary winding of a step-up transformer, wiring and the like can gradually increase thereby affecting the operation of the inverter circuit, and thus it has a limitation to make the driving frequency higher.

Specifically, in a collector resonance type inverter circuit for a discharge tube as shown in FIG. 3, a ballast capacitor 22 is connected between one end of a secondary winding SW1 of a step-up transformer 21 and one electrode of a fluorescent lamp 24, and such ballast capacitor 22 normally has a capacitance of several picofarads (pF) to several tens picofarads though the capacitance thereof can differ depending on a driving frequency for the inverter circuit.

Whereas a parasitic capacitance 23 caused in the secondary side of the step-up transformer 21 and a parasitic capacitance 25 caused in the circumference of the fluorescent lamp 24 are normally of several picofarads, respectively.

The parasitic capacitance 25 can be increased in case a connecting wire between the secondary output of the step-up transformer 21 and the fluorescent lamp 24 is long, and hence there is a limitation on the length of the connecting wire, too.

In the above-mentioned inverter circuit, a high voltage induced across the secondary winding SW1 of the step-up transformer 21 is divided in voltage by a series combination of the ballast capacitor 22 and the parasitic capacitance 25 and this divided high voltage lower than the high voltage across the secondary winding SW1 is supplied to the fluorescent lamp 24.

Since, in circuit design, the ballast capacitor 22 is smaller in its capacitance as the driving frequency for the inverter circuit is higher, the ratio of the parasitic capacitance 25 to the ballast capacitor 22 becomes greater in the range in which the driving frequency is high. This causes the results that a voltage for discharge supplied to the fluorescent lamp 24 is lowered, which in turn causes the brightness or luminance of the fluorescent lamp 24 to decrease, and therefore there is needed such a consideration that turn ratio of the step-up transformer 21 is made greater than that determined by the circuit design or the like.

Moreover, a load as seen from the primary side is capacitive due to the influence of the ballast capacitor 22 and the parasitic capacitances 23, 25 and deteriorates the power factor.

This results in increase of a reactive current flowing through a collector winding (primary winding PW1 of the step-up transformer 21 one end of which is connected to the collector of a first transistor TR1 and the other end of which is connected to the collector of a second transistor TR2) and hence a copper loss or ohmic loss of the collector winding is increased thereby lowering the efficiency of the circuit. In FIG. 3, the step-up transformer is composed of a core 11, the primary winding PW1, a base winding PW2, and the secondary winding SW1, and IN1 and IN2 are input terminals of the inverter circuit to which a DC voltage is applied, C1 connected between the input terminals IN1 and IN2 is a capacitor for storing charges, CH1 is a choke coil for limiting a current, R1 and R2 are resistors connected to bases of the transistors TR1 and TR2, respectively, and C2 is a capacitor connected across the primary winding PW1.

For that reason, it is necessary to make it possible to use higher driving frequencies thereby further reducing the step-up transformer in size by working out a new circuit design inclusive of parasitic capacitances.

Also, a high voltage-resistant capacitor used as a ballast capacitor is requested to have high reliability, but there often occurs a failure or defect of an inverter circuit for a discharge tube due to a failure or defect of the high voltage-resistant capacitor. Hence it is desirable not to use a capacitor as a ballast from an aspect of the reliability.

In addition, it is possible to use an inductive choke coil as a ballast. However, in case of using an inductive load, there can occur that starting or continuation of oscillation of a self-excited inverter circuit for a discharge tube is difficult.

In order to resolve that problem, in an inverter circuit for a discharge tube using an inductive ballast, a capacitive load is added to the secondary side of the inverter circuit so as to cancel an inductive load as seen from the primary side thereof so that starting or continuation of oscillation of the inverter circuit can be easily done.

As described above, a step-up transformer used in a prior inverter circuit for a discharge tube has an EI type core consisting of two magnetic pieces of E and I shapes or an EE type core consisting of two magnetic pieces of E and E shapes adopted as a magnetic core thereof. The volume of the core of such shape occupies a considerable space in the whole inverter circuit, that is, it is the core of the step-up transformer that occupies a large space in the inverter circuit, and so the core is an obstacle or bar to miniaturization of the inverter circuit. Therefore, as long as a closed magnetic flux type step-up transformer is used in an inverter circuit, there is a limitation on miniaturization of the step-up transformer.

Accordingly, it is needed to implement the miniaturization of the step-up transformer by reconsidering or reviewing the shape of the core and the magnetic circuit.

SUMMARY OF THE INVENTION

The present invention is done in view of the foregoing aspect and intends to provide, in one aspect thereof, an inverter circuit for a discharge tube in which the secondary side circuit of a step-up transformer used in the inverter circuit is constructed as a high frequency power supply circuit for supplying a high voltage to the discharge tube to turn on it, and a parasitic or stray capacitance produced in the secondary winding of the step-up transformer and a parasitic or stray capacitance produced in the circumference of the discharge tube constitute a resonance circuit serving as the high frequency power supply circuit with an inductive ballast. Also, the present invention intends to provide, in another aspect thereof, an inverter circuit for a discharge tube in which the secondary side circuit of a leakage flux type step-up transformer used in the inverter circuit is constructed as a high frequency power supply circuit for supplying a high voltage to the discharge tube to turn it on, and a parasitic capacitance produced in the secondary winding of the leakage flux type step-up transformer and a parasitic capacitance produced in the circumference of the discharge tube constitute a resonance circuit serving as the high frequency power supply circuit with a portion of the secondary winding which acts as a choke coil.

SUMMARY OF THE INVENTION

In an inverter circuit for a discharge tube or lamp, typically two kinds of parasitic or stray capacitances are produced in the secondary side circuit of a step-up transformer, one is a parasitic or stray capacitance produced in the secondary winding of the step-up transformer and the other is a parasitic or stray capacitance produced in the wiring and the circumference of the discharge tube. By omitting a ballast capacitor used to limit a current in a prior inverter circuit and using as the step-up transformer an extreme leakage flux type one, that is, a step-up transformer having extremely high leakage flux, the output of the step-up transformer becomes inductive.

The leakage flux type step-up transformer has a current limiting effect in itself and since the output thereof is inductive, it has the same effect as that of a choke coil. In order to further develop the above nature, when a rod-shaped core is used and the whole shape of the step-up transformer is made a rod shape, there is provided a leakage flux type step-up transformer which has extremely high leakage flux and wherein a portion of the secondary winding near to the primary winding, namely, a secondary winding portion which magnetically close couples with the primary winding (hereinafter also referred to as the close coupling secondary winding portion) operates as a normal secondary winding of a step-up transformer and so serves as a step-up transformer, whereas a portion of the secondary winding remote from the primary winding, namely, a secondary winding portion which magnetically loose couples with the primary winding (hereinafter also referred to as the loose coupling secondary winding portion) serves as a choke coil. Therefore, this extreme leakage flux type step-up transformer can be considered to be one having an equivalent circuit consisting of a closed leakage flux type step-up transformer having variable step-up ratio and a variable inductance type ballast choke coil connected in series with the secondary winding of the transformer, and also to be one having a structure in which the choke coil is combined integrally with the step-up transformer as viewed from the configuration thereof.

However, when an extreme leakage flux type step-up transformer is used as a step-up transformer, the rate of the portion of the secondary winding remote from the primary winding, that is, the loose coupling secondary winding portion, which acts as a choke coil, is greater than that of the portion of the secondary winding near to the primary winding, that is the close coupling secondary winding portion, which acts as a step-up transformer so that a strong current limiting action is effected. As a result, a sufficient current for discharge cannot be supplied to a discharge tube.

Hence in the present invention a series resonance circuit is composed of the portion of the loose coupling secondary winding portion, a parasitic or stray capacitance produced in the secondary winding, and a parasitic or stray capacitance produced in the periphery of the discharge tube whereby the resonance circuit produces and supplies to a discharge tube a high voltage sufficient to turn it on, and thus the parasitic or stray capacitances which are deemed to be harmful in inverter circuits of the prior art are turned into useful capacitances according to the present invention. If the total parasitic capacitance of the resonance circuit is of an insufficient value which is short of a value required to create a series resonance, then an auxiliary capacitor can be added in parallel with the discharge tube and thus a high voltage for discharge sufficient to turn on a discharge tube can be supplied to the discharge tube.

Also, in case of using a choke coil as a ballast, a series resonance circuit is formed by the choke coil, a parasitic or stray capacitance produced in the secondary winding, and a parasitic or stray capacitance produced in the circumference of a discharge tube, and thus a high voltage for discharge sufficient to turn on the discharge tube can be supplied to the discharge tube, likewise with the case mentioned above.

If the total parasitic capacitance is of an insufficient value which is short of a value required to create a series resonance, then an auxiliary capacitor is added in parallel with the discharge tube thereby adjusting the resonance frequency.

Further, even though parasitic or stray capacitances produced in the secondary winding of the step-up transformer and in the wiring and the circumference of the discharge tube are of a value which is not negligible in circuit design or plan, these parasitic capacitances are utilized to form a resonance circuit together with the inductive ballast so that a high voltage for discharge sufficient to turn on the discharge tube can be supplied to the discharge tube.

BRIEF DESCRIPTION OF THE DRAWINGS

The above and other aspects of the present invention will become clear from the following description which is given by way of example but not limited thereto, with reference to the accompanying drawings in which.

DETAILED DESCRIPTION OF THE PREFERRED EMBODIMENTS

Now the present invention will be described in detail with reference to the accompanying drawings.

Figure 1:
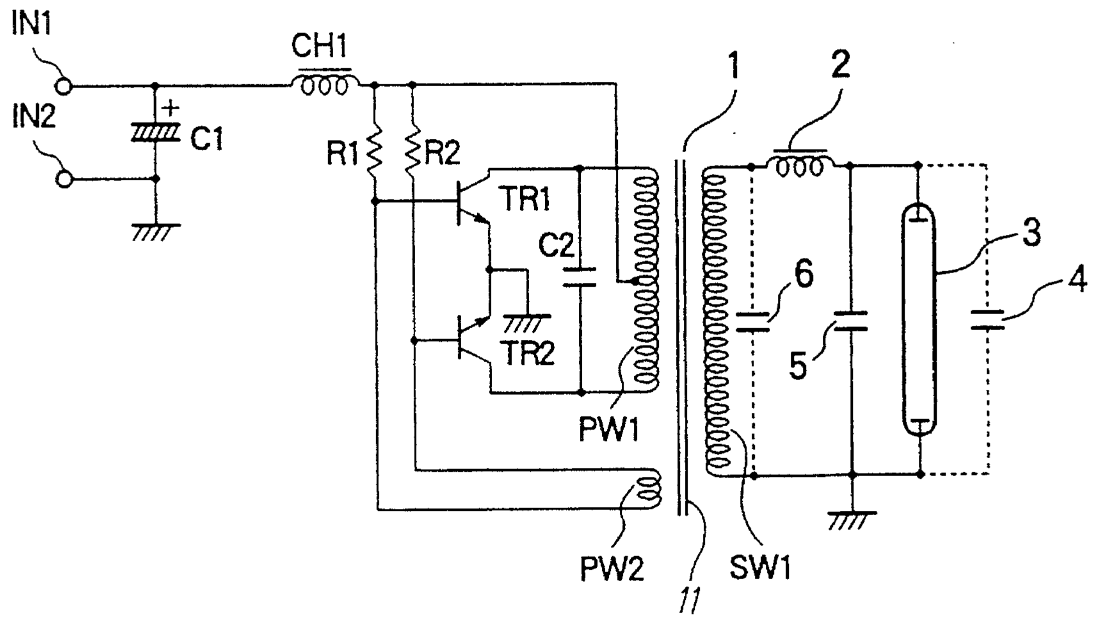
FIG. 1 is an equivalent schematic diagram showing an embodiment of the present invention.

FIG. 1 is an equivalent schematic diagram showing an embodiment of the present invention in which a capacitor such as used in an inverter circuit of the prior art is replaced with a choke coil that functions as a ballast.

In FIG. 1, a DC voltage is applied to input terminals IN1 and IN2 from a DC power source such as a primary cell or secondary cell or a suitable DC power supply. The one input terminal IN2 is grounded and the other input terminal IN1 is connected to a capacitor C1 and a choke coil CH1 the other end of which is connected to a center tap of a first primary winding PW1 (collector winding) of a step-up transformer 1 as well as to bases of first and second transistors TR1 and TR2 through first and second resistors R1 and R2, respectively. The bases of the transistors TR1 and TR2 are also connected to a second primary winding PW2 (base winding) of the transformer 1 and the emitters of the transistors TR1 and TR2 are connected in common and grounded. The collectors of the transistors TR1 and TR2 are connected to the first primary winding PW1 of the transformer 1 and a capacitor C2 is connected in parallel with the first primary winding PW1.

The secondary winding SW1 (high-voltage winding) of the transformer 1 is connected to a discharge tube or lamp 3 such as a fluorescent lamp through a choke coil 2 which acts as a ballast. The discharge lamp 3 may be used for backlighting a small size liquid crystal display device.

The choke coil 2 is effective for limiting a current and also acts to form a series resonance circuit together with a parasitic or stray capacitance 4 caused in the circumference of the discharge lamp 3 and a parasitic or stray capacitance 6 caused in the secondary winding SW1. This resonance circuit resonates with the output of the secondary winding SW1 thereby producing a high voltage sufficient to turn on the discharge lamp 3 so that it turns on reliably.

In such case, if the total capacitance of the parasitic capacitance 4 caused in the circumference of the discharge lamp 3 and a parasitic or stray capacitance 6 caused in the secondary winding SW1 is short of a calculated value of creating a series resonance, then an additional capacitor 5 will be connected in parallel with the parasitic capacitance 4 to adjust the resonance frequency (since the parasitic capacitance 6 caused in the secondary winding SW1 has substantially a fixed value determined by the step-up transformer used, in practice the parasitic capacitance 4 caused in the circumference of the discharge lamp 3 is adjusted). Reference numeral 11 denotes a core of the step-up transformer.

Figure 2:
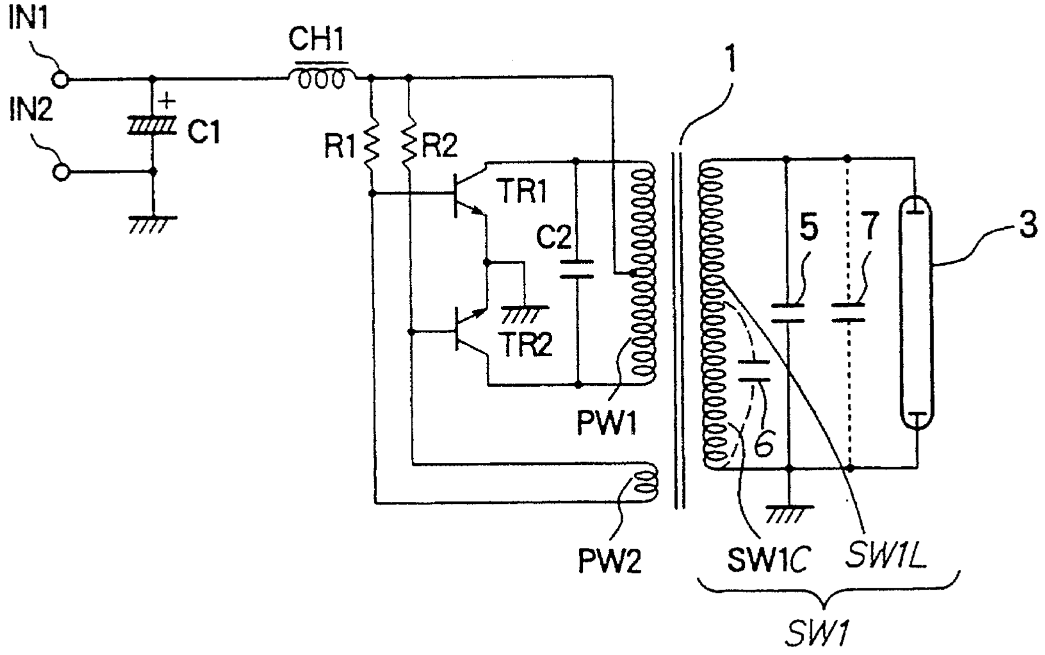
FIG. 2 is an equivalent schematic diagram showing another embodiment of the present invention.
Figure 3:
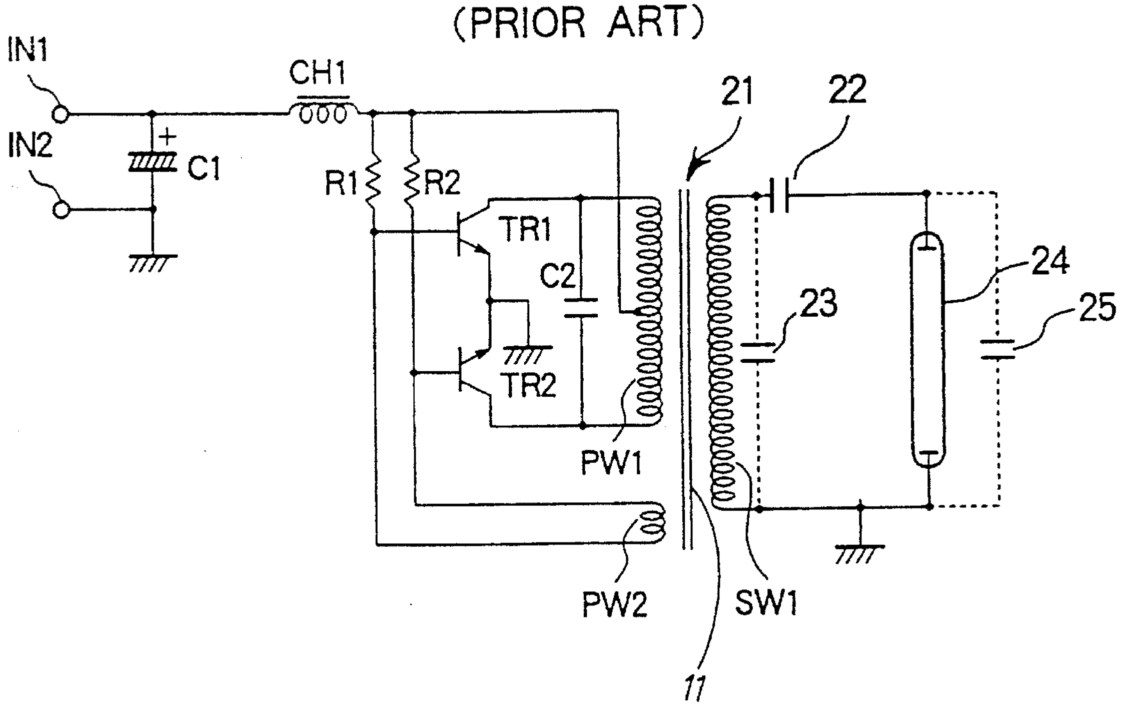
FIG. 3 (PRIOR ART)
FIG. 3 is an equivalent schematic diagram showing a prior collector resonance type inverter circuit.

FIG. 2 is an equivalent schematic diagram showing another embodiment of the present invention in which the step-up transformer 1 is replaced by an extreme leakage flux type one, that is, a transformer having extremely much leakage flux, so that the output of the secondary side circuit becomes inductive. As is described before, the secondary winding SW1 of the leakage flux type step-up transformer 1 has the close coupling secondary winding portion SW1C which serves mainly as a normal secondary winding of the step-up transformer (that is, effects a step-up operation) and the loose coupling secondary winding portion SW1L which serves mainly as a choke coil. A parasitic capacitance 6 caused in the close coupling secondary winding portion SW1C and a parasitic capacitance caused in the circumference of a discharge lamp 3 form a series resonance circuit together with the loose coupling secondary winding portion SW1L thereby supplying a high voltage to the discharge lamp 3.

Likewise, in such case, if the parasitic capacitance 7 caused in the circumference of the discharge lamp 3 is short of a calculated value of creating a series resonance, then an additional capacitor 5 will be connected in parallel with the parasitic capacitance 7 to adjust the resonance frequency.

Figure 4:
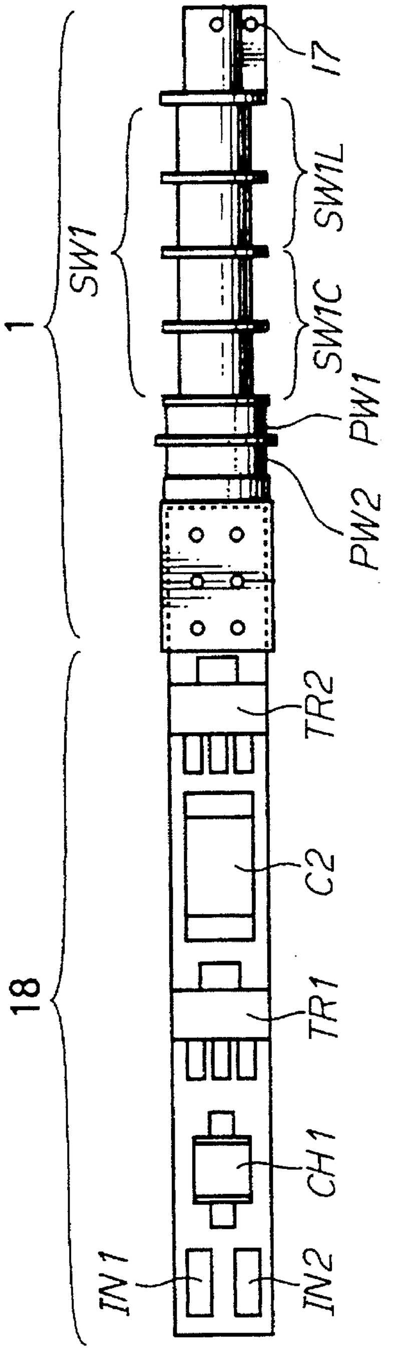
FIG. 4 is a plan view of the outline of the another embodiment of the present invention.
Figure 5:
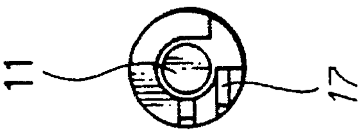
FIG. 5 is a right side view of the FIG. 4 with a printed circuit board removed.

FIGS. 4 and 5 show the outline or configuration of the extreme leakage flux type step-up transformer 1 used in the second embodiment of the present invention mentioned above, that is, the step-up transformer which is constructed to have extremely high leakage flux. The step-up transformer 1 shown has a cylindrical shape in this embodiment, and may have a square or multi-cornered pillar-like shape or the like.

The second primary winding PW2, namely, the base winding of the step-up transformer 1 is wound about a bobbin (not shown) at a portion thereof corresponding to one end of a core 11 (see FIG. 5) of round rod shape and the first primary winding PW1, namely, the collector winding of the step-up transformer 1 is wound about the bobbin adjacent to the base winding PW2.

In addition, the secondary winding SW1 is wound about the bobbin adjacent to the collector winding PW1 with the starting end of the secondary winding SW1 positioned adjacent to the collector winding PW1 and the terminating end thereof positioned at a portion of the bobbin corresponding to the other end of the core 11. The terminating end of the secondary winding SW1 is led out to a terminal 17 attached to the bobbin. In case the starting end of the secondary winding SW1 adjacent to the collector winding PW1 is grounded, the highest voltage is produced at the terminating end thereof which is farthest off from the primary side circuit. In FIG. 4, and the loose coupling secondary winding portion SW1C which acts as a step-up transformer, and the loose coupling secondary winding portion SW1L, which acts as a choke coil, are shown as each wound about two sections of the bobbin, respectively. However, the boundary between the close coupling secondary winding portion SW1C and the loose coupling secondary winding portion SW1L of the secondary winding SW1 cannot be clearly defined (it is the middle point of the secondary winding SW1 as shown in FIG. 4) because the boundary can be moved depending upon the load (discharge lamp 3 in this example) connected across the secondary winding SW1. The round rod shape core 11 is coaxially positioned at the center of the transformer 1 as shown in FIG. 5 and extends substantially from the starting end of the base winding PW2 to the terminating end of the secondary winding SW1.

A strip-like printed circuit board 18 is prepared which has peripheral circuit components or parts mounted or packaged thereon such as the transistors TR1, TR2, the choke coil CH1, the capacitor C2, the resistors R1, R2, the capacitor C1 (the resistors R1, R2 and the capacitor C1 are not shown in FIG. 4 since they are mounted on the rear side of the printed circuit board 18). One end of the printed circuit board 18 is integrally attached to the end of the bobbin opposite to the the terminating end of the secondary winding 14 along the axial direction of the bobbin.

In case the secondary winding 14 was formed with a wire of about 0.04 mm in diameter wound around the bobbin by about 1000 turns to about 4000 turns, it was found that the parasitic capacitance 6 caused in the secondary winding SW1 and the parasitic capacitance 7 caused in the circumference of the discharge lamp 3, formed a resonance circuit together with the loose coupling secondary winding portion SW1L side so that a high voltage sufficient to turn on the discharge lamp 3 was applied to the discharge lamp 3.

In such case, in a circuit design of an inverter circuit for use with a cold-cathode discharge tube the rated firing potential or breakdown voltage of which is 1000 V, the rated steady state discharging voltage of which is 300 V and the rated electric power of which is 2 W, the size of the cylindrical step-up transformer 1 has 4.8 mm in diameter and 35 mm in length which is of very small size as compared with a prior inverter circuit using a step-up transformer having an EI type or EE type core and having the same specification.

Moreover, assembly of the step-up transformer is completed by only inseting the rod-like core 11 into the center bore of the bobbin after the primary and secondary windings are wound around the bobbin, and therefore the step-up transformer thus constructed is advantageous in mass production.

In addition, the frequency range within which the parasitic capacitance effectively acts is from about 100 kHz to about 500 kHz in a circuit design of an inverter circuit for use with a cold-cathode discharge tube, and a step-up transformer used in the inverter circuit can be very reduced in size.

Figure 6:
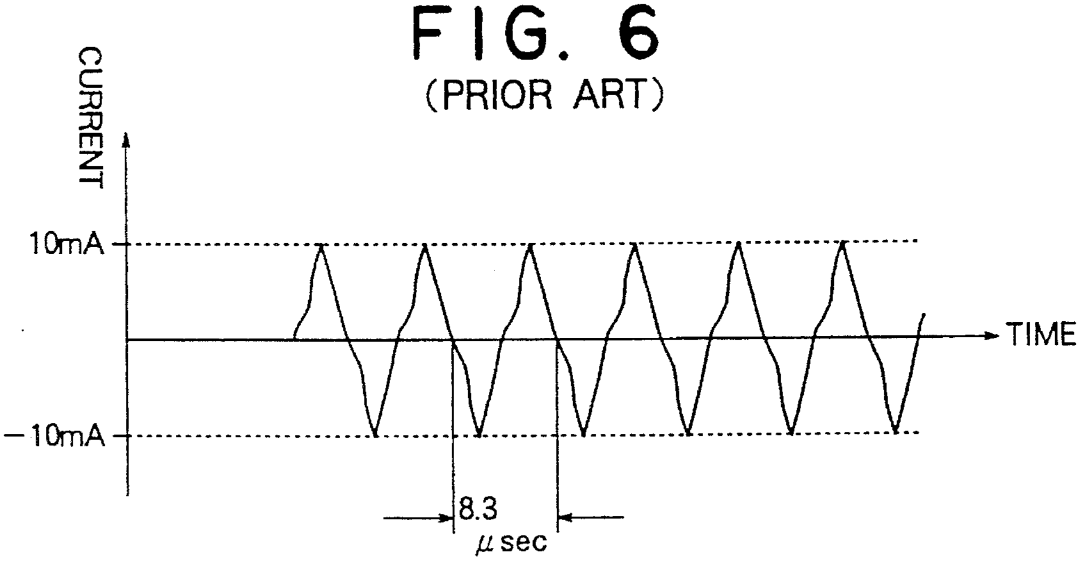
FIG. 6 (PRIOR ART)
FIG. 6 shows a waveform depicting a discharging current of a discharge tube used in a prior inverter circuit.
Figure 7:
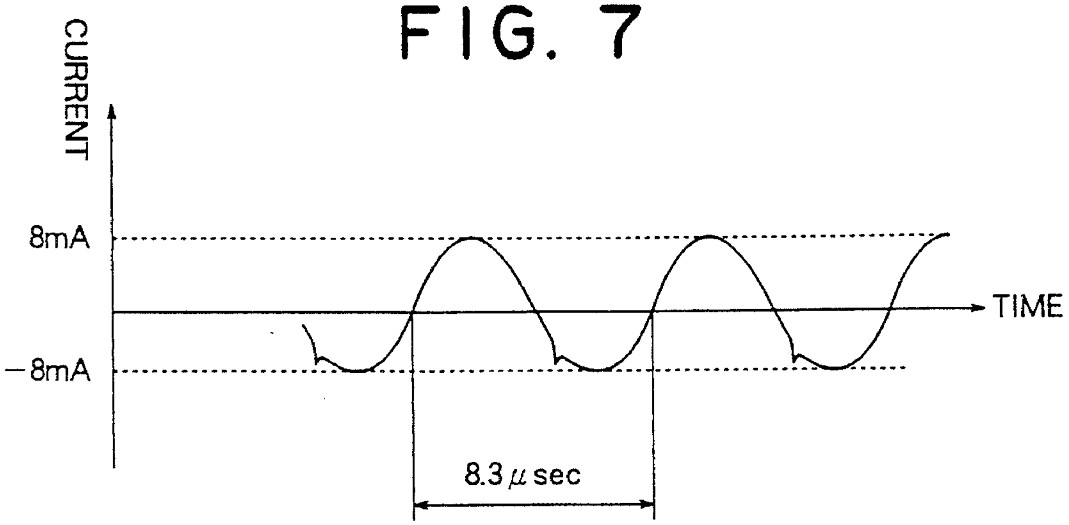
FIG. 7 shows a waveform depicting a discharging current of a discharge tube used in the inverter circuit of the present invention.

FIG. 6 shows a discharging current of a discharge tube used in a prior inverter circuit, and FIG. 7 shows a discharging current of a discharge tube used in the inverter circuit according to the present invention.

In the prior inverter circuit, as is apparent from FIG. 6, the current waveform flowing through the fluorescent lamp is distorted and contains higher-order harmonic waves which are easy to become radiation noises. Whereas in the inverter circuit of the present invention, since the high frequency power supply circuit is constructed by a series resonance circuit, the current waveform and voltage waveform are close to a sinusoidal wave and do not contain harmonic waves as is clear from FIG. 7. As a result, most of the radiation noises are only fundamental waves and there is an advantage that a countermeasure for the noise is easily taken.

As is apparent from the foregoing, according to the present invention, parasitic capacitances are used as elements or components forming a resonance circuit and so a higher driving frequency for an inverter circuit can be adopted as compared with that of prior art. Accordingly, a step-up transformer used in the inverter circuit can be miniaturized.

Also, since a capacitive component and an inductive component in the secondary side circuit of the step-up transformer cancel out with each other, the power factor is improved so that a reactive current flowing through the primary winding (collector winding) of the step-up transformer is reduced and a loss due to a copper loss is decreased and the efficiency of the inverter circuit becomes higher.

Further, the secondary winding of the step-up transformer can be terminated at end portion which is farthest off from the primary winding thereof and the highest voltage produced in the secondary winding can be brought to this end potion, which leads to an advantage in a countermeasure for high voltage.

Moreover, if suitable conditions are selected, a high voltage-resistant capacitor can be omitted so that a failure of the inverter circuit due to a failure of the capacitor is prevented whereby the reliability of the inverter circuit is improved, and the inverter circuit can be simply constructed and miniaturized.

Furthermore, a leakage magnetic flux type transformer has inherent nature in which, even if the output of the secondary side is shorted, an overcurrent does not only flow through the primary side but also all of the magnetic flux produced in the primary side are leaked to form a loop thereby limiting a current flow, and so there is provided a safe construction against a short circuit between wire layers of the secondary winding and the reliability of the inverter circuit becomes higher.

We claim:

1. An inverter circuit for a discharge tube comprising:

a step-up transformer having a core, a primary winding and a secondary winding;

an inductive ballast connected to one end of said secondary winding;

a discharge tube connected across said secondary winding through said inductive ballast in series therewith; and a resonance circuit composed of a parasitic or stray capacitance produced in said secondary winding, said inductive ballast, and a parasitic or stray capacitance produced in the circumference of said discharge tube, said resonance circuit producing a high voltage by the resonance thereof that is supplied to said discharge tube in order to turn said discharge tube on.

2. The inverter circuit according to claim 1, further including a capacitor connected in parallel with said discharge tube.

3. The inverter circuit according to claim 1, wherein said inductive ballast is a choke coil.

4. An inverter circuit for a discharge tube comprising: a leakage flux type step-up transformer having an elongated core disposed in substantially a center of said step-up transformer, a primary winding and a secondary winding, said primary winding and secondary winding being wound about said elongated core in juxtaposed relation with each other along said core so that said secondary winding has a portion near to said primary winding which magnetically close couples with said primary winding and a portion remote from said primary winding which magnetically loose couples with said primary winding;

a discharge tube connected across said secondary winding; and a resonance circuit composed of a parasitic or stray capacitance produced mainly in the close coupling portion of said secondary winding, the loose coupling portion of said secondary winding, and a parasitic or stray capacitance produced in the circumference of said discharge tube, said resonance circuit producing a high voltage by the resonance thereof that is supplied to said discharge tube in order to turn said discharge tube on.

5. The inverter circuit according to claim 4, further including a capacitor connected in parallel with said discharge tube.

* * * * *